United States Patent
Honma et al.

(10) Patent No.: US 6,766,400 B2
(45) Date of Patent: Jul. 20, 2004

(54) DISK ARRAY APPARATUS AND INTERRUPT EXECUTION METHOD OF THE SAME

(75) Inventors: Kazuya Honma, Tokyo (JP); Takuya Saegusa, Tokyo (JP)

(73) Assignee: NEC Corporation, Tokyo (JP)

(*) Notice: Subject to any disclaimer, the term of this patent is extended or adjusted under 35 U.S.C. 154(b) by 429 days.

(21) Appl. No.: 09/892,848

(22) Filed: Jun. 28, 2001

(65) Prior Publication Data

US 2002/0004889 A1 Jan. 10, 2002

(30) Foreign Application Priority Data

Jul. 10, 2000 (JP) ........................................ 2000-208269

(51) Int. Cl.$^7$ .............................................. G06F 13/24
(52) U.S. Cl. ....................... 710/261; 710/260; 711/111; 711/114
(58) Field of Search ............................ 711/4, 111, 112, 711/113, 167, 114; 710/260, 261, 262, 263

(56) References Cited

U.S. PATENT DOCUMENTS

| | | | | |
|---|---|---|---|---|
| 5,309,567 A | * | 5/1994 | Mizukami | 710/110 |
| 5,894,587 A | * | 4/1999 | Normoyle et al. | 710/310 |
| 6,012,121 A | * | 1/2000 | Govindaraju et al. | 710/260 |
| 6,115,776 A | * | 9/2000 | Reid et al. | 710/260 |
| 6,115,779 A | * | 9/2000 | Haubursin et al. | 710/262 |
| 6,185,639 B1 | * | 2/2001 | Kailash et al. | 710/48 |
| 6,467,008 B1 | * | 10/2002 | Gentry, Jr. et al. | 710/261 |

FOREIGN PATENT DOCUMENTS

| | | |
|---|---|---|
| JP | 6-139176 A | 5/1994 |
| JP | 7-72980 A | 3/1995 |
| JP | 7-311659 | 11/1995 |
| JP | 9-223091 A | 8/1997 |
| JP | 10-105487 A | 4/1998 |
| JP | 10-207822 | 8/1998 |
| JP | 10-333836 A | 12/1998 |

* cited by examiner

*Primary Examiner*—Gary Portka
(74) *Attorney, Agent, or Firm*—Sughrue Mion, PLLC

(57) ABSTRACT

A disk array apparatus and an interrupt execution method of the same enables command processing received from an upper level apparatus to be executed in high-speed by reducing rate of the interrupt and substantial processing speed not to decrease even when a write command from the upper level apparatus is continuously executed. A configuration is capable of executing selectively either an immediate interrupt or a delay interrupt. Selection is made to execute the immediate interrupt in the case of a write command while in the case of a read-out command, the delay interrupt is selected. Moreover, Judgment whether or not competition of page occurs when the write command is detected, namely whether or not a region of a cache memory that becomes execution object of the command is used is performed. Only when competition of the page occurs, handling is switched from general delay interrupt to an immediate interrupt. It is possible to reduce waiting time caused by competition of the page while immediately releasing the region of the cache memory that becomes execution object of the command.

7 Claims, 6 Drawing Sheets

DISK ARRAY APPARATUS AND INTERRUPT EXECUTION METHOD OF THE SAME

BACKGROUND OF THE INVENTION

1. Field of the Invention

The present invention relates to an interrupt handling of a disk array apparatus. More particularly, the present invention relates to a disk array apparatus that has constitution capable of implementing interrupt handling so that completion reports of a plurality of data transmission are summarized in one interrupt and an improvement of an interrupt execution method of the disk array apparatus.

2. Description of the Related Art

In recent years development of computer with high-speed operation is making progress. Under the circumstances, development of peripheral apparatus of the computer with high-speed operation is ardently desired. Magnetic disk apparatus is one of peripheral apparatus of the computer. A disk array apparatus is made to enhance reliability of the magnetic disk apparatus. Also, the disk array apparatus is one whose function enables the magnetic disk apparatus to work in more high-speed operation.

The Japanese Patent Application Laid Open No. HEI 10-207822 discloses one of the method for executing high-speed data processing. This method is generally known. According to this method, efficiency of a processing apparatus is improved in such a way that the number of the interrupt is reduced. Namely, the first transfer completion report of a data packet is received. The interrupt pauses and waits for an elapse of stand-by permissible time set beforehand from the first transfer completion report of the packet data. Or the interrupt pauses and waits until the transfer completion report reaches the number of limit set beforehand.

However, there occurs following problems when executing the aforementioned way for obtaining high-speed operation with the interrupt reduced in the disk array apparatus.

Generally, the disk array apparatus uses an exclusive cache memory for executing read-out of the data or write of the data. This exclusive cache memory of the disk array apparatus is used for high-speed processing of a read-out command or a write command that are received from an upper level apparatus. Here, the official gazette of the Japanese Patent Application Laid Open No. HEI 7-311659 discloses the way of access of the cache memory. Generally, access is executed using unit of data block (hereinafter referred to as page) in which basic unit of the data block multiplies sector capacity on the magnetic disk apparatus thus contained by an integer.

For that reason, exclusive operation is required when accessing the page of the cache memory. The exclusive operation is one in which acquisition (open) of the corresponding page and release (close) of the acquired page are implemented in order to guarantee legality of the data.

FIG. 6 is a flowchart. The flowchart indicates processing procedure of the disk array apparatus when receiving a write command or a read-out command from an upper level apparatus. The disk array apparatus receives the write command from the upper level apparatus (S 201). The disk array apparatus verifies whether or not page of the cache memory including an objective sector to be written is already opened. If the corresponding page is already opened, operation pauses and waits until the page is closed caused by the necessary point of maintenance of exclusiveness (S 202).

The disk array apparatus newly opens the corresponding page (S 203). Subsequently, the disk array apparatus starts data transfer to receive the write data from the upper level apparatus for storing in the cache memory (S 204). Here, completion of the data transfer is reported by the interrupt. Therefore, operation pauses and waits for the interrupt of the transfer completion report which indicates its completion (S 205). Then, the interrupt of the transfer completion report is detected, and completion of the data transfer is ascertained. After this operation, processing ends while closing the opened page (S 206).

On the other hand, when the disk array apparatus receives the read-out command from the upper level apparatus, the disk array apparatus, firstly, verifies whether or not the page including the data of objective position is hit (to be developed) within the cache memory (S 207). The disk array apparatus opens the page in the case of cache-hit (S 208). While, in the case of cache-miss the disk array apparatus opens the page of the magnetic disk apparatus including the data of objective position (S 209), and the disk array apparatus reads-out the data from the magnetic disk apparatus to store in the cache memory (S 210). Subsequently, the disk array apparatus starts the data transfer from the disk array apparatus to the upper level apparatus (S 211), and operation pauses and waits for the interrupt of the transfer completion report that indicates its completion (S 212). Then, when the data transfer is completed, the disk array apparatus closes the opened page.

The disk array apparatus executes aforementioned processing. In that case, the disk array apparatus receives various kinds of write commands continuously. Also, the disk array apparatus receives the write command with sequential pattern in the unit of sector and/or the write command for the same sector from the upper level apparatus. At this time, there is possibility that conflict occurs about the open of the page caused by overlapping accesses intended by the disk array apparatus to the same page at which data to be object of the write and/or read-out exists in connection with the cache memory. By this conflict, the write command following on the heels of the first received write command should wait until the page that becomes the object of the write depending on the first write command is closed.

Consequently, as described-above, if the aforementioned way is used, the problems occur. According to the aforementioned means, efficiency of a processing apparatus is improved in such a way that the number of the interrupt is reduced. Namely, the first transfer completion report of a data packet is received. The interrupt pauses and waits for an elapse of stand-by permissible time set beforehand from the first transfer completion report of the packet data. Or the interrupt pauses and waits until the transfer completion report reaches the number of limit set beforehand. Accordingly, completion of the first received write command namely the interrupt of the transfer completion report which indicates transfer completion of the last data packet of a series of the data packets does not generate until the stand-by permissible time set beforehand elapses, or until transfer of the data packets corresponding to the number of limit of the transfer completion report is executed. Accordingly, close of the page is not executed until the stand-by permissible time elapses, thus the problem that processing of the following write command should be waited occurs.

Namely, the delay interrupt described above is intended to improve performance of the processing apparatus in such a way as to reduce the number of generation of the interrupt.

However, the delay interrupt itself increases substantial processing time more than necessary processing time. Thus, there is the problem that primary object of high-speed data processing is inhibited.

Further, there may occur of deterioration of performance caused by access conflict for the page of the cache memory not only when receiving continuous write command described-above, but also when receiving a write command continuously after the read-out command in which the data to be the object exists in the same page.

Namely, in such a conventional apparatus, control of delay interrupt for reducing rate of the interrupt is performed regardless of the type of the command received from the upper level apparatus. For that reason, there is the problem that processing performance of I/O deteriorates according to the type of pattern of the received command from the upper level apparatus.

SUMMARY OF THE INVENTION

In view of the foregoing it is an object of the present invention to provide a disk array apparatus and execution method of the same that achieves drawbacks of the conventional techniques, and enables the command processing received from the upper level apparatus to be executed in high-speed in such a way as to reduce rate of interrupt, while, it causes substantial processing speed not to deteriorate under the condition that write command from the upper level apparatus is executed continuously.

An interrupt execution method of a disk array apparatus with a cache memory contained of the present invention is the interrupt execution method of the disk array apparatus capable of performing a high-speed data transfer to an upper level apparatus. The aforementioned object is achieved in such a way as to selectively execute either an immediate interrupt for immediately generating the interrupt when receiving a transfer completion report of the first data packet or a delay interrupt for generating the interrupt while waiting an elapse of stand-by permissible time set beforehand or the number of limit of the transfer completion report set beforehand after receiving the transfer completion report of the first packet.

According to application of such constitution, the immediate interrupt and the delay interrupt are capable of being executed selectively. Therefore, when the whole handling speed is improved caused by reducing the number of generation of the interrupt by using the delay interrupt, the delay interrupt is selected to be used. On the other hand, if the whole handling speed is improved as access to the page of the cache memory is made to execute frequently rather than the number of generation itself of the interrupt being reduced, the immediate interrupt is selected to be used.

On this occasion, it is desirable that judgment of selection whether the immediate interrupt is executed or the delay interrupt is executed is performed on the basis of the type of the command from the upper level apparatus.

Generally, in the case of the write command the immediate interrupt is selected, while in the case of the read-out command the delay interrupt is selected. Generally, in the case of the write command, possibility of continuous handling operation is high in comparison with the read-out command, accordingly, also probability that competition of the page occurs is high.

Further, also it is possible to achieve the same object in such a way as to execute an immediate interrupt only when the specified type of the command, for instance, the write command from the upper level apparatus is detected while executing the delay interrupt with steady-state.

The disk array apparatus of the present invention is capable of achieving the aforementioned object by the constitution in which the disk array apparatus includes a main control unit which possesses both an immediate interrupt execution function and a delay interrupt execution function, flag setting means for setting either an immediate interrupt execution flag or a delay interrupt execution flag in compliance with a type of commands from an upper level apparatus, and interrupt function selecting means for starting either the immediate interrupt execution function or the delay interrupt execution function while referring to the set flag set by the flag setting means.

The flag setting means and the interrupt function selecting means are capable of being substantially placed in the apparatus as part of the operation program of the main control unit.

The flag setting means sets the immediate interrupt execution flag when the command from the upper level apparatus is a write command, while when the command from the upper level apparatus is a read-out command, the flag setting means sets the delay interrupt execution flag.

The disk array apparatus of the present invention is capable of achieving the aforementioned object by the configuration in which the disk array apparatus, in the above constitution, further includes interrupt command output means for outputting the immediate interrupt execution command only when specified command from the upper level apparatus is detected and a region of a cache memory that becomes execution object of this command is already used at this time point, and immediate interrupt starting means for starting the immediate interrupt execution function when receiving this immediate interrupt execution command instead of the flag setting means and the interrupt function selecting means.

BRIEF DESCRIPTION OF THE DRAWINGS

The various features of novelty which characterize the invention are pointed out with particularly in the claims annexed to and forming a part of this specification. For a better understanding of the invention, its operating advantages, and specific objects attained by its use, reference should be had to the accompanying drawings and descriptive matter in which there is illustrated and described a preferred embodiment of the invention.

DETAILED DESCRIPTION OF THE PREFERRED EMBODIMENTS

Figure 1:
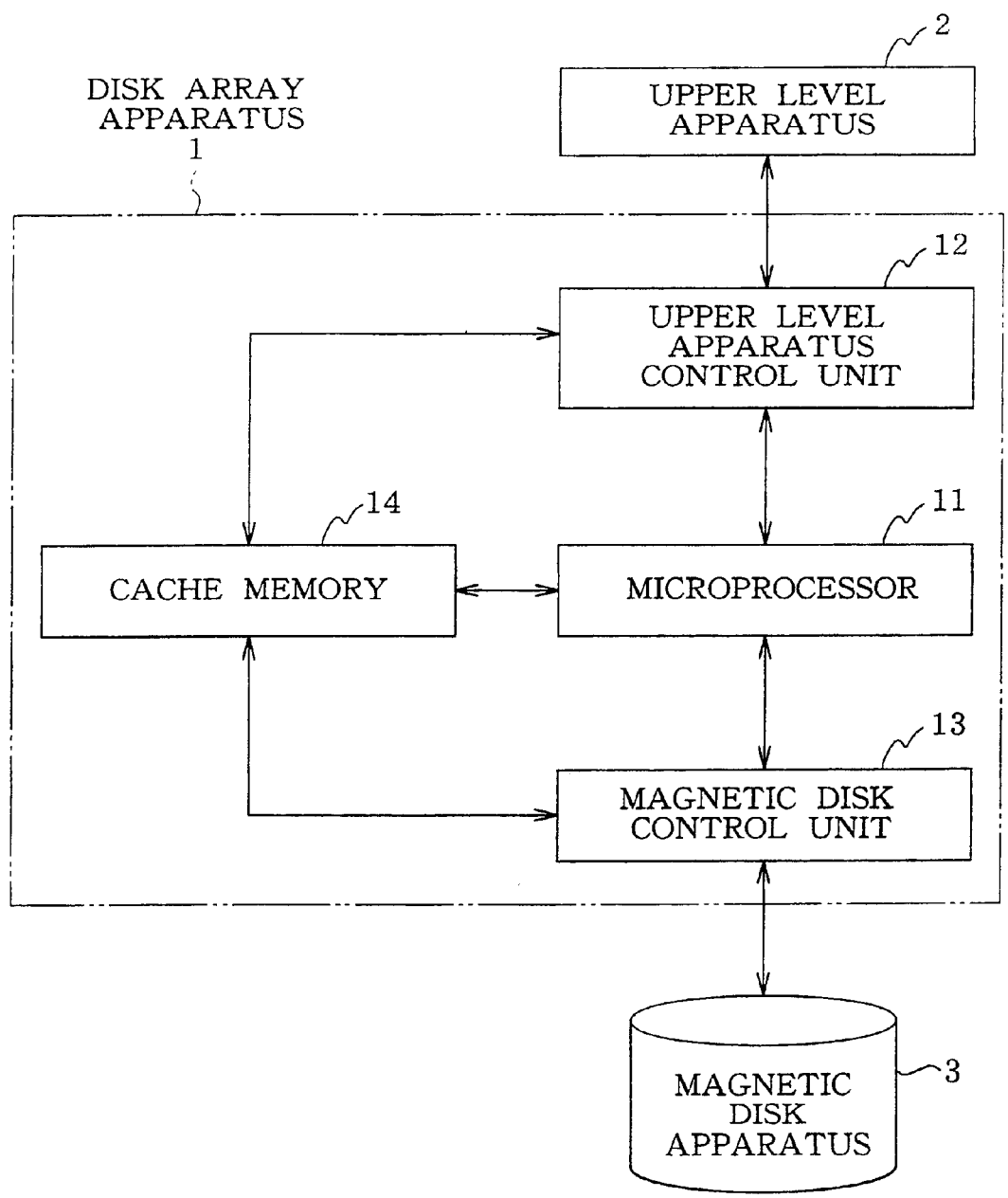
FIG. 1 a block diagram illustrating outline of a configuration of a disk array apparatus of one embodiment to which execution method of interrupt is applied, of the present invention.

Some preferred embodiments according to the present invention will be described in detail referring to accompanying drawings below. FIG. 1 is a block diagram illustrating outline of a configuration of a disk array apparatus of one embodiment to which execution method of an interrupt of the present invention is applied.

As illustrated in FIG. 1, the disk array apparatus 1 is connected between the upper level apparatus 2 such as a personal computer and so forth and a magnetic disk apparatus 3. The upper level apparatus 2 is one which gives instruction such as the read-out command and the write command to the disk array apparatus 1. Access of data with sector as a unit to a cache memory 14 of the disk array apparatus 1 is possible. The magnetic disk apparatus 3 is constituted by a magnetic head, a magnetic medium and so forth which are not illustrated. The magnetic disk apparatus 3 finally records and stores the data therein.

The disk array apparatus 1 comprises a microprocessor 11 that becomes main control unit, a upper level apparatus control unit 12, a magnetic disk control unit 13, and a cache memory 14. The microprocessor 11 controls the whole of the disk array apparatus 1 depending on a control program.

An upper level apparatus control unit 12 is connected to the upper level apparatus 2 and controls input-output of the data between the disk array apparatus 1 and the upper level apparatus 2. Here, the data transfer is executed by instruction of the micro processor 11 to the upper level apparatus control unit 12. Transfer completion report in connection with input-output control of the data transfer depending on the instruction from the micro processor to the upper level apparatus control unit 12 is reported from the upper level apparatus control unit 12 to the microprocessor 11 due to the interrupt control.

Further, a magnetic disk control unit 13 is connected to the magnetic disk apparatus 3. The magnetic control unit 13 controls input-output of data between the disk array apparatus 1 and the magnetic disk apparatus 3.

The cache memory 14 temporarily stores therein a write data received from the upper level apparatus 2 or a read-out data read-out from the magnetic disk apparatus 3 in every page unit. The cache memory 14 is constituted by semiconductor memories capable of executing access with high-speed more than that of the magnetic disk apparatus 3.

Figure 2:
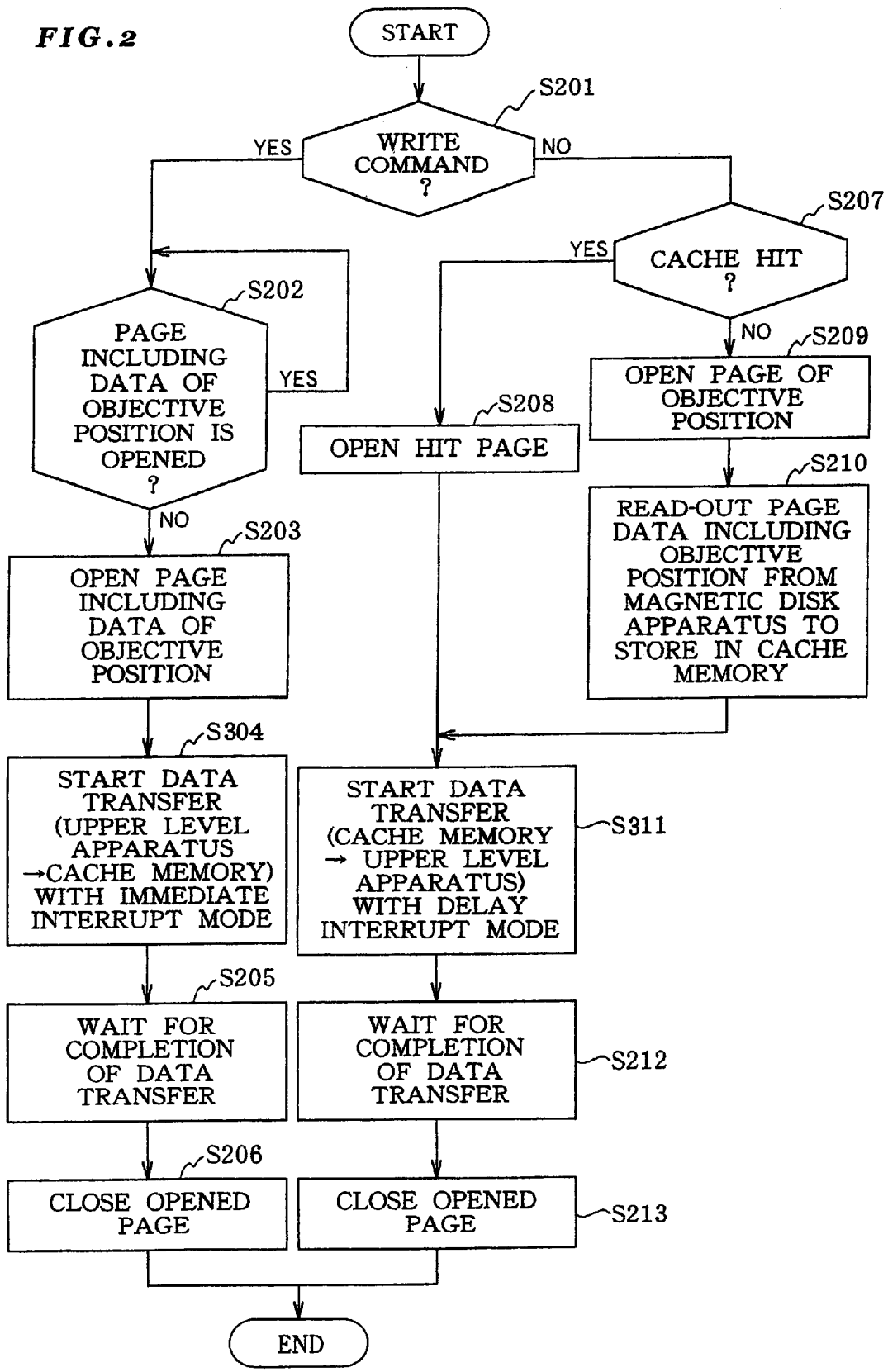
FIG. 2 is a flowchart illustrating outline of operation of a micro processor when disk array apparatus of the present embodiment receives write command and/or read-out command from the upper level apparatus.

FIG. 2 is a flowchart illustrating operations of the microprocessor 11 of the disk array apparatus 1 when receiving the write command or the read-out command from the upper level apparatus 2.

Figure 6:
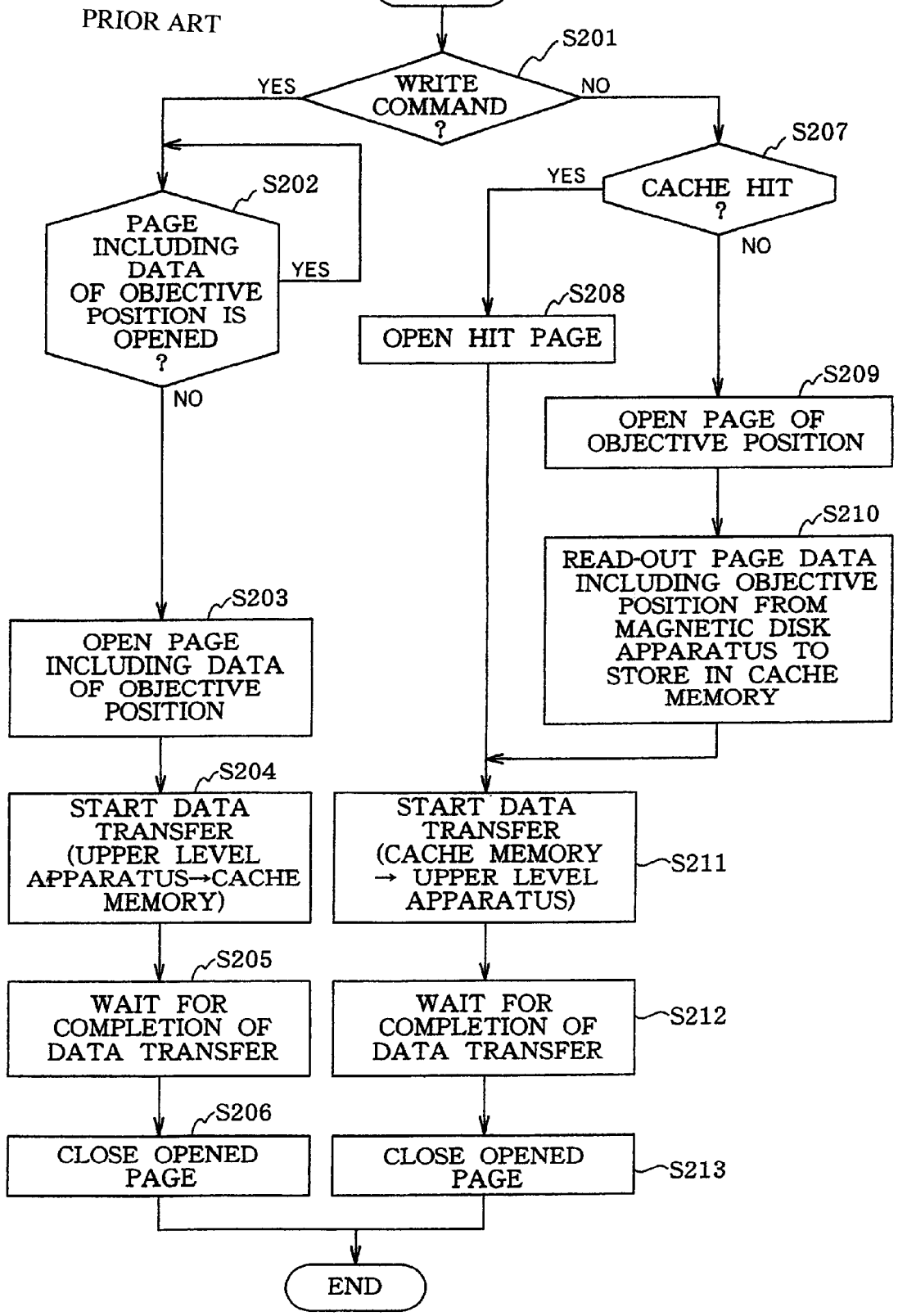
FIG. 6 is a flowchart illustrating outline of processing procedure when conventional disk array apparatus receives the write command and/or the read-out command from the upper level apparatus.

The present processing procedure is different from the conventional processing procedure illustrated in FIG. 6 in that on the occasion of the data transfer between the upper level apparatus 2 and the cache memory 14 within the disk array apparatus 1, the setting of the interrupt mode is made to change according to the type of the command from the upper level apparatus 2 in terms of processing of S 304 and S 311. Furthermore, concerning another points, the processing procedure is the same as that of the conventional example illustrated FIG. 6, therefore, the explanation is omitted.

Here, setting of the interrupt mode in S 304 and S 311 is achieved by setting either an immediate interrupt execution flag or a delay interrupt execution flag. Accordingly, the microprocessor 11 that executes processing of S 304 and S 311 constitutes substantial flag setting means.

As illustrated in FIG. 2, the microprocessor 11 as the flag setting means sets the immediate interrupt execution flag when the write command from the upper level apparatus 2 is detected (S 304), while when the read-out command is detected, the microprocessor 11 sets the delay interrupt execution flag (S 311).

Two types of the interrupt modes of the immediate interrupt mode and the delay interrupt mode are prepared as control program beforehand. The immediate interrupt mode is that when the data transfer of the first data packet is completed, the interrupt is immediately generated. The delay interrupt mode is that the interrupt is generated after waiting for an elapse of stand-by permissible time set beforehand or waiting for the number of limit of the transfer completion report set beforehand, after receiving the transfer completion report of the first data packet. These modes are executed by the microprocessor 11 that achieves role of both the immediate interrupt execution function realization means and the delay interrupt execution function realization means.

Figure 3:
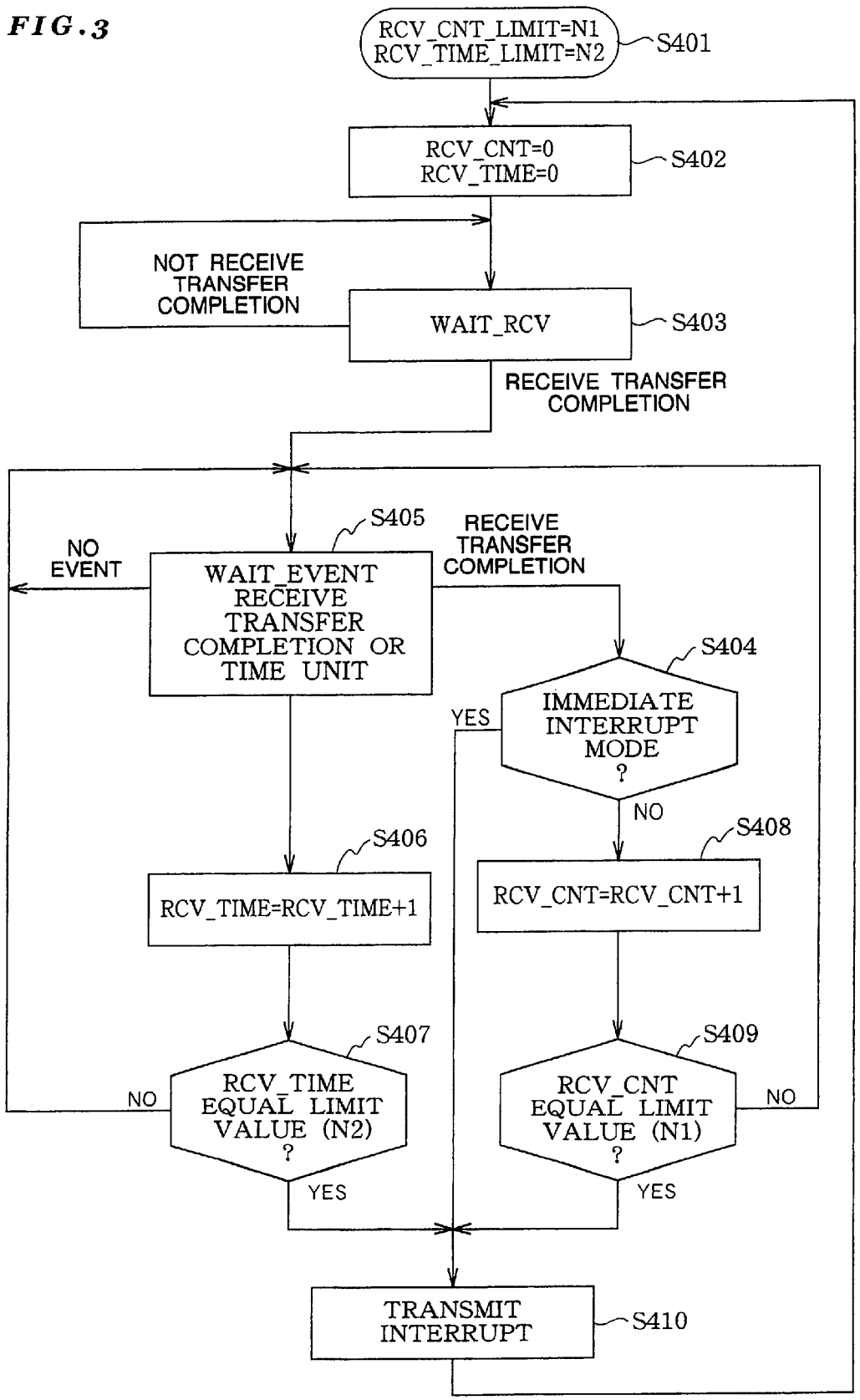
FIG. 3 is a flowchart illustrating transmission procedure of the interrupt indicating that control unit of the upper level apparatus of the same embodiment has completed data transfer to the micro processor.

FIG. 3 is a flowchart illustrating transmission procedure of the interrupt for indicating that the upper level apparatus control unit 12 has completed the data transfer toward the microprocessor 11.

In FIG. 3, RCV_CNT_LIMIT is a parameter for defining the number of completion report of the data transfer capable of sending at one time in the delay interrupt mode, further, RCV_TIME_LIMIT is a parameter of the stand-by permissible time for defining time-over when transmitting the completion report of the data transfer, namely, that is the maximum value of delay time in completion-waiting of the data transfer.

Further, RCV_CNT is a counter for counting the number of completion of the data transfer, while RCV_TIME is a counter for counting stand-by time before transmitting the interrupt of the transfer completion report, in fine, RCV_TIME is a counter for counting elapsed time, with reception time point of the first data packet as starting point, by amount of unit time. WAIT_RCV indicates stand-by condition for waiting for the completion report of the data transfer, while WAIT_EVENT indicates stand-by condition for waiting for generation of completion of the data transfer or for waiting until the aforementioned unit time elapses.

As illustrated in FIG. 3, the upper level apparatus control unit 12 executes initial setting of parameters N1 and N2 for determining timing in order to transmit the interrupt of the completion report of the data transfer in the delay interrupt mode toward each RCV_CNT_LIMIT, RCV_TIME_LIMIT at the step of time for warming up (S 401). Moreover, the value of N1 for defining the number of limit of the number of completion report of the data transfer and the value of N2 for defining the stand-by permissible time are values which are adjusted to be obtained from frequency of issue of the command in the upper level apparatus 2, and which are capable of resetting as the occasion demands.

Subsequently, the upper level apparatus control unit 12 initializes two counters of RCV_CNT and RCV_TIME to zero (S 402). The upper level apparatus control unit 12 enters into the stand-by condition for waiting for completion of the data transfer (S 403). The upper level apparatus control unit 12 refers to the interrupt execution flag set at the processing of aforementioned S 304 or S 311 when the completion of the data transfer is detected to ascertain the interrupt mode selected at the present time point (S 404).

Then, when the interrupt mode is the delay interrupt mode, the upper level apparatus control unit 12 waits for the stand-by permissible time N2 or the limit value N1 of the number of the transfer completion report depending on the WEIT_EVENT (S 405, S 406, S 407, S 408 and S 409).

More concretely, in the processing of the WAIT_EVENT of S 405, instrumentation processing of the elapsed time according to synchronization with machine clock and so forth, thus 1 increment of value of the RCV_TIME is carried-out in every elapsed unit time (S 406). Judgment is made to execute whether or not the value of the elapsed time RCV_TIME from the first event reception, namely, the value of the elapsed time RCV_TIME from reception of the first data packet reaches the stand-by permissible time RCV_TIME_LIMIT (N2) (S 407). The actual elapsed time multiplies the RCV_TIME by the unit time. The aforementioned judgment processing of the interrupt mode (S 404), count-up processing of the number of transfer completion report RCV_CONT (S 408) and judgment processing whether or not the number of the transfer completion report reaches the number of limit RCV_CNT_LIMIT (N1) are made to execute (S 409) whenever the completion of the data transfer corresponding to one packet is detected as the event due to the WAIT_EVENT.

Then, any of the judgment result of S 407 or S 409 becomes true. If the number of transfer completion report reaches interrupt generation timing in the delay interrupt mode, the upper level apparatus control unit 12 transmits the interrupt which informs completion of the data transfer for the micro processor 11 (S 410).

On the other hand, when the interrupt mode is set to the immediate interrupt mode, the upper level apparatus control unit 12 does not continue stand-by depending on the WAIT_EVENT. The upper level apparatus control unit 12 immediately transmits the interrupt which informs completion of the data transfer using the immediate interrupt mode to the microprocessor 11.

Thus, the upper level apparatus control unit 12 executes judgment of the present interrupt mode while referring to value of the interrupt execution flag. The upper level apparatus control unit 12 selectively executes either the delay interrupt mode or the immediate interrupt mode in compliance with the judgment result. The upper level apparatus control unit 12 is substantial interrupt function selection means.

According to the above embodiment, even though sequential write command with the unit of the sector and/or the write command for the same sector are continuously received from the upper level apparatus 2, the report can be performed without waiting for the completion report of the data transfer until limitation of the stand-by permissible time or until limitation of the number of completion report. Therefore, it is prevented increase of processing time caused by unnecessary stand-by time. Consequently, reduction of the whole processing time is achieved.

Furthermore, in the case of reception of the read-out command, the number of times of the interrupt generation is capable of being reduced depending on the processing which utilizes general delay interrupt like the conventional example indicated in the official gazette of the Japanese Patent Application Laid Open No. HEI 10-207822. Accordingly, over-load caused by excessive generation of the interrupt can be prevented.

However, in the embodiment illustrated in FIG. 2 and FIG. 3, in the case of the reception of the write command, the immediate interrupt mode is unconditionally selected, while in the case of the read-out command, the delay interrupt mode is unconditionally selected, therefore, rate of interrupt which is generated at the time of execution of the write command is incapable of being reduced.

Figure 4:
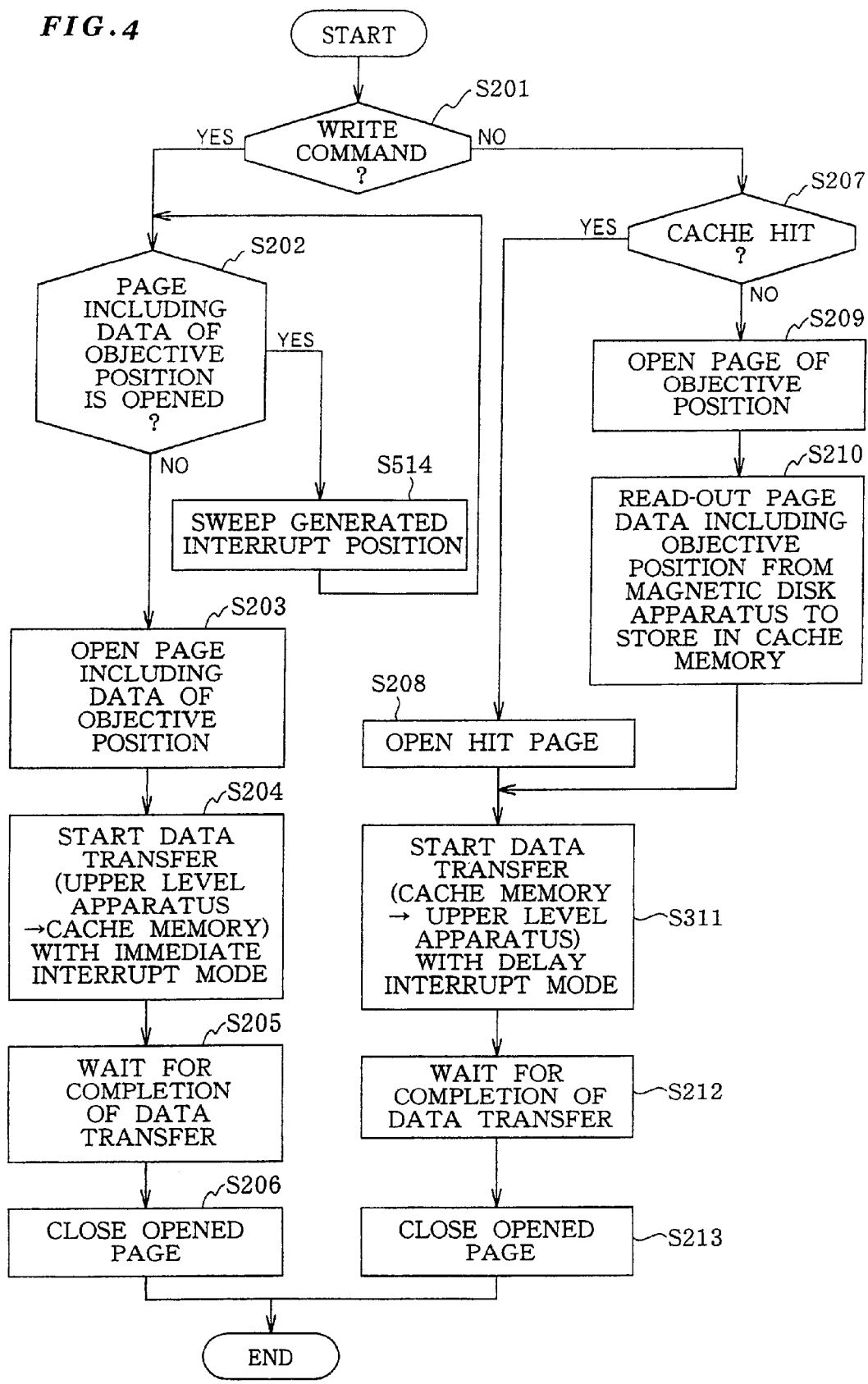
FIG. 4 is a flowchart illustrating outline of operation of the micro processor when the disk array apparatus receives the write command and/or the read-out command from the upper level apparatus, particularly, a flowchart when generation of the interrupt in the write command is suppressed.
Figure 5:
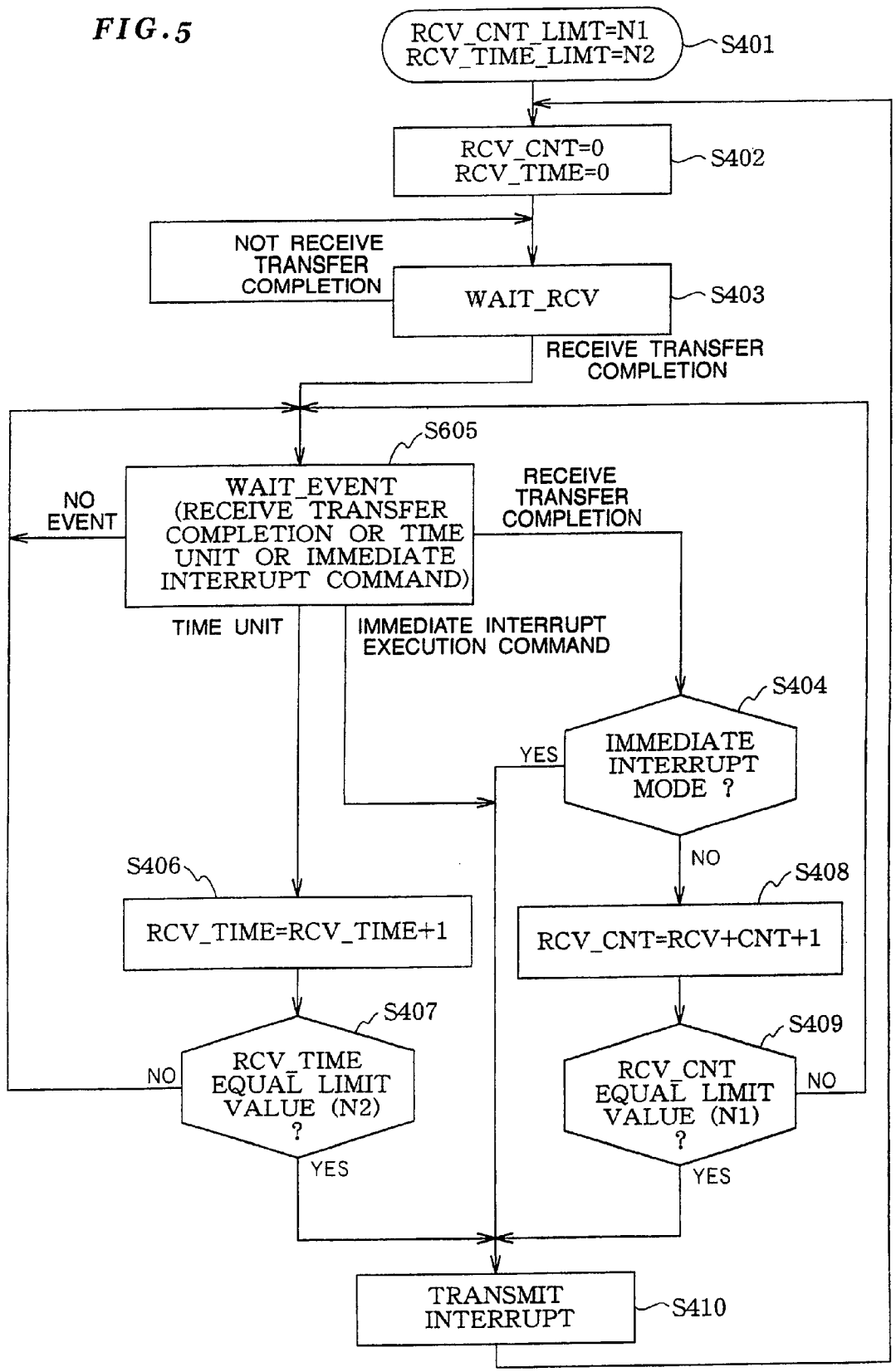
FIG. 5 is a flowchart illustrating transmission procedure of the interrupt indicating that the control unit of the upper level apparatus completes the data transfer to the micro processor, particularly, a flowchart when generation of the interrupt in the write command is suppressed.

Next, processing of the disk array apparatus in which the interrupt is capable of being reduced in the case of the reception of the write command is illustrated in FIG. 4 and FIG. 5. Configuration of the hardware part is the same as that of FIG. 1.

FIG. 4 is a flowchart illustrating operations of the microprocessor 11 so that the interrupt is reduced regardless of data transfer against the write command on the basis of FIG. 2.

There exist different point on FIG. 4 in comparison with FIG. 2. The disk array apparatus 1 receives the write command (S 201), at the time point of reception, the disk array apparatus 1 judges whether or not the page including data of the objective position is already opened (S 202). When the page including the data of the objective position is already opened, namely, only when the region of the cache memory 14 which becomes execution object of the write command to be the specified command is already used at this time point, the disk array apparatus 1 outputs the immediate interrupt execution command (command for immediately transmitting the completion report of the generated data transfer). Operations of the microprocessor 11 in FIG. 4 differs from that of FIG. 2 on this point.

Here, the microprocessor 11 outputs the immediate interrupt execution command only when the write command to be the specified command is detected and the region of the cache memory 14 which becomes execution object of the write is already used. The microprocessor 11 constitutes substantial interrupt command output means.

Then, the microprocessor 11 judges again whether or not the page is opened. If the page is closed, the microprocessor 11 newly opens the page (S 203). Then, the microprocessor 11 starts the data transfer of the write with delay interrupt mode for transmitting the interrupt when exceeding the stand-by permissible time or the number of limit of the transfer completion report (S 504). Then, if completion of the started data transfer is reported (S 205), the microprocessor closes the page thus opened (S 206).

FIG. 5 is a flowchart illustrating processing of the side of the upper level apparatus control unit 12 in compliance with the processing procedure of FIG. 4, namely, interrupt handling of the completion report of the data transfer against the microprocessor.

The embodiment of FIG. 5 differs from that of FIG. 3 described-above in that the upper level apparatus control unit 12 watches the input of the immediate interrupt execution command from the microprocessor 11 in the processing of WAIT_EVENT of S 605, for immediately transmitting the interrupt of the transfer completion report at the time point the command being detected.

Namely, when the page of the cache memory 14 competes with each other in the condition of S 202 illustrated in FIG. 4. At this time, the upper level apparatus control unit 12 detects the immediate interrupt execution command transmitted from the microprocessor 11 on the processing of WAIT_EVENT of S 605. The upper level apparatus control unit 12 temporarily switches setting of the interrupt mode from the general delay interrupt mode to the immediate interrupt mode. Thereby, transfer completion signals of the commands are immediately transmitted. These transfer completion signals of the commands are kept in a stand-by condition in the processing of S 404, S 408, S 409, S 605, or S 406, S 407, S 605. Competition of the page is canceled in such a way that the opened page on the condition of S 202 is immediately closed.

By the processing of FIG. 4 and FIG. 5 described above, it becomes capable of reducing rate of the interrupt in the write command like the read-out command. Simultaneously, increase of processing time caused by unnecessary stand-by condition is prevented. Consequently, performance of I/O processing of the disk array apparatus 1 is capable of being improved.

Moreover, operations of the immediate interrupt execution command are capable of applying to all cases where access to the cache memory 14 competes with each other. The operations of the immediate interrupt execution command are capable of applying to not only the case where aforementioned write command is received, but also the case where the write command whose data of the objective position becomes the same page is received close on the heels of the read-out command.

According to the present invention, the immediate interrupt and the delay interrupt are capable of being executed selectively. Therefore, when the whole handling speed is improved caused by reducing the number of generation of the interrupt by using the delay interrupt, the delay interrupt is used. On the other hand, if the whole handling speed is improved as access to the page of the cache memory is made to execute frequently rather than the number of generation itself of the interrupt being reduced, the immediate interrupt is selected. Since, either the delay interrupt or the immediate interrupt is capable of being executed selectively, the whole handling speed of the disk array apparatus and the upper level apparatus is improved.

Generally, processing efficiency is improved in such a way as to reduce the interrupt of the completion report of the data transfer while utilizing the delay interrupt. Competition of access to the page of the cache memory occurs when the sequential write and/or write to the same sector in every sector unit from the upper level apparatus should continuously be executed. In this case, namely, only when the region of the cache memory that becomes execution object of the command is occupied to be used, competition is made to cancel while immediately executing close and open of the page in such a way as to execute the immediate interrupt. Therefore, immediate processing is guaranteed without elapsing excessive stand-by time even though the sequential write and/or the write to the same sector occur.

Further, the judgment of selection whether the immediate interrupt is executed or the delay interrupt is executed is implemented on the basis of the type of the command from the upper level apparatus, or the judgment of selection is implemented depending on whether or not the region of the cache memory that becomes execution object of the command is already occupied to be used (whether or not competition of access to the page occurs), therefore, automatic internal processing is capable of being easily achieved.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-208269 (Filed on Jul. 10, 2000) including specification, claims, drawings and summary are incorporated herein by reference in its entirety.

What is claimed is:

1. An interrupt execution method of a disk array apparatus that contains a cache memory, capable of performing high-speed data transfer with an upper level apparatus, in which either an immediate interrupt or a delay interrupt is made to execute selectively, said method comprising, in accordance with types of commands from said upper level apparatus:

immediately generating an interrupt when receiving a transfer completion report of a first data packet; and generating an interrupt with a predetermined delay, said generating being based on an elapse of stand-by permissible time set beforehand, or a number of received transfer completion reports reaching a limit set beforehand, after receiving the transfer completion report of the first data packet, wherein when said command is a write command, the immediate interrupt is executed, while when said command is a read-out command, the delay interrupt is executed.

2. An interrupt execution method of a disk array apparatus that contains a cache memory, capable of performing high-speed data transfer with an upper level apparatus, said method comprising:

regularly generating an interrupt with a predetermined delay, said regularly generating being based on an elapse of stand-by permissible time set beforehand, or a number of received transfer completion reports reaching a limit set beforehand, after receiving the transfer completion report of a first data packet; and when a specified type of command is detected from said upper level apparatus, immediately generating an interrupt when receiving a transfer completion report of the first data packet.

3. An interrupt execution method of a disk array apparatus according to claim 2, wherein said specified command is a write command.

4. A disk array apparatus that contains a cache memory, capable of performing high-speed data transfer with an upper level apparatus, said disk array apparatus comprising:

a main control unit which executes an immediate interrupt execution function for immediately generating an interrupt when receiving a transfer completion report of a first data packet, and executes a delay interrupt execution function for generating the interrupt with delay based on either an elapse of a stand-by permissible time set beforehand, or a number of received transfer completion reports reaching a limit set beforehand, after receiving the transfer completion report of the first data packet;

a flag setting means for setting either an immediate interrupt execution flag or a delay interrupt execution flag in accordance with a type of commands transmitted from an upper level apparatus; and an interrupt function selecting means for starting either said immediate interrupt execution function or said delay interrupt execution function while referring to the set flag set by said flag setting means.

5. A disk array apparatus according to claim 4, wherein said flag setting means sets the immediate interrupt execution flag when the command from the upper level apparatus is a write command, while when the command from the upper level apparatus is a read-out command, said flag setting means sets the delay interrupt execution flag.

6. A disk array apparatus that contains a cache memory, capable of performing high-speed data transfer with an upper level apparatus, said disk array apparatus comprising:

a main control unit which executes an immediate interrupt execution function for immediately generating an interrupt when receiving a transfer completion report of a first data packet and, executes a delay interrupt execution function for generating the interrupt with delay based on either an elapse of a stand-by permissible time set beforehand, or a number of received transfer completion reports reaching a limit set beforehand, after receiving the transfer completion report of the first data packet;

an interrupt command output means for outputting the immediate interrupt execution command only when a specified command transmitted from the upper level apparatus is detected and a region of a cache memory which is an execution object of the specified command is being accessed by another command; and an immediate interrupt starting means for starting said immediate interrupt execution function when receiving said immediate interrupt execution command.

7. A disk array apparatus according to claim 6, wherein said specified command is a write command.

* * * * *